(12) United States Patent
Du et al.

(10) Patent No.: US 11,906,616 B2
(45) Date of Patent: Feb. 20, 2024

(54) METHOD OF TARGET FEATURE EXTRACTION BASED ON MILLIMETER-WAVE RADAR ECHO

(71) Applicant: XIDIAN UNIVERSITY, Xi'an (CH)

(72) Inventors: Lan Du, Xi'an (CN); Zengyu Yu, Xi'an (CN); Xiaoyang Chen, Xi'an (CN); Zenghui Li, Xi'an (CN); Chunxin Wang, Xi'an (CN)

(73) Assignee: Xidian University, Xi'an (CN)

( * ) Notice: Subject to any disclaimer, the term of this patent is extended or adjusted under 35 U.S.C. 154(b) by 294 days.

(21) Appl. No.: 17/381,658

(22) Filed: Jul. 21, 2021

(65) Prior Publication Data
US 2022/0155432 A1    May 19, 2022

(30) Foreign Application Priority Data
Nov. 19, 2020  (CN) .......................... 202011298444.X (51) Int. Cl.
*G01S 13/44* (2006.01)
*G01S 7/35* (2006.01)
*G01S 7/41* (2006.01)

(52) U.S. Cl.
CPC .......... *G01S 13/449* (2013.01); *G01S 7/354* (2013.01); *G01S 7/356* (2021.05); *G01S 7/414* (2013.01)

(58) Field of Classification Search
CPC .... G01S 13/343; G01S 13/449; G01S 13/584; G01S 7/354; G01S 7/356; G01S 7/414
See application file for complete search history.

(56) References Cited

U.S. PATENT DOCUMENTS

2015/0346321 A1\* 12/2015 Jansen ...................... G01S 7/02
                                                         342/107
2022/0137181 A1\* 5/2022 Santra ..................... G01S 7/352
                                                         342/450

\* cited by examiner

*Primary Examiner* — Timothy A Brainard
(74) *Attorney, Agent, or Firm* — Grogan, Tuccillo & Vanderleeden, LLP (57) ABSTRACT

The present disclosures discloses a method of target feature extraction based on millimeter-wave radar echo, which mainly solves the problems that techniques in the prior art cannot fully utilize raw radar echo information to obtain more separable features and cannot accurately distinguish targets with similar physical shapes and motion states. The method is implemented as follows: acquiring measured data of targets, generating an original RD map, and removing ground clutter of the map; sequentially performing target detection, clustering and centroid condensation on the RD map after the ground clutter removal; acquiring a continuous multi-frame RD maps and carrying out the target tracking; according to the tracking trajectory, selecting candidate areas and extracting features based on a single piece of RD map and features based on two successive RD maps, respectively.

7 Claims, 8 Drawing Sheets

METHOD OF TARGET FEATURE EXTRACTION BASED ON MILLIMETER-WAVE RADAR ECHO

CROSS REFERENCE TO RELATED APPLICATION(S)

This patent application claims the benefit and priority of Chinese Patent Application No. 202011298444.X, filed on Nov. 19, 2020, the disclosure of which is incorporated by reference herein in its entirety as part of the present application.

TECHNICAL FIELD

The present disclosure relates to the technical field of radar, and further relates to a method of radar target feature extraction, which can be used for the road surface target recognition task during unmanned driving.

BACKGROUND ART

Road surface target recognition based on visual information in the prior art has developed rapidly, while the method of road surface target recognition based on radar information has just started up. In the field of target recognition based on millimeter-wave radar, most of technologies in the prior art focus on the processing and application of point cloud data, and some organizations have also proposed methods of feature extraction by using a Range Doppler RD map.

In *Point Cloud Features-based Kernel SVM for Human-Vehicle Classification in Millimeter Wave Radar*, Zhao Z et al. proposed a method for extracting target-related features from target point cloud slices according to physical characteristics of objects, including target extension in different directions, mean variance of velocity, mean variance of radar cross-sectional areas and other features, and used different support vector machines to complete the target classification. However, the acquisition process of point cloud data is complex, which is demanding in hardware conditions of millimeter-wave radar, requires a high angular resolution of radar, and contains information that is not rich, thus limiting the feature extraction of a single target slice.

Researches of the method for feature extraction based on the target RD map mainly focus on the process of extraction utilizing a single piece of RD map. In *Pedestrian Classification for 79 GHz Automotive Radar Systems*, Robert Prophet et al. extracted features that can reflect the physical structure or micro-motion of a target, including the target extension in range and extension in velocity, etc., and used the support vector machine to complete the target classification. This type of feature extraction methods are limited by the single piece of RD map, which cannot obtain effective features for classification from objects that are similar in motion state and physical structure.

SUMMARY

The present disclosure aims at proposing a method of target feature extraction based on millimeter-wave radar echo against deficiencies mentioned above of technologies in the prior art, in order to make full use of raw radar echo information and obtain more features facilitating the road surface target classification in the case of limited radar hardware conditions.

According to the technical idea of the present disclosure, features are fully extracted from road targets appearing during the unmanned driving by utilizing raw radar echo information, so as to obtain richer classification features and achieve a better classification effect on targets that are similar in physical shape and motion state.

(1) Measured target data based on millimeter-wave radar is obtained, and an original Range Doppler RD map of the targets is generated by using the measured data;

(2) A CLEAN algorithm is used to remove ground clutter in the original Range Doppler RD map of the target;

(3) An improved cell-averaging CFAR algorithm is used to detect the target of the RD map with clutter removed:

(3a) A cell to be detected is selected, and energy average values of several adjacent reference cells to the left of, to the right of, on top of, and below the cell to be detected are calculated, respectively;

(3b) According to specific experimental scenes and conditions, a threshold is set by using the energy average values obtained in (3a), so as to compare the energy of the current cell to be detected with the threshold, wherein: if the energy of the cell to be detected is greater than or equal to the threshold, the cell is determined to be a target and its coordinate is recorded, otherwise the cell is dismissed;

(3c) Operations (3a) and (3b) are performed on all pixels in the RD map to obtain all detected target points in the RD map;

(4) The detected targets are clustered by using DB SCAN algorithm, and then centroid condensation is performed on the clustered targets;

(5) (1) to (4) are repeated to obtain a continuous multi-frame RD map;

(6) The Kalman filtering method is used for tracking targets on the continuous multi-frame RD map obtained in (5), and candidate areas on each RD map are selected according to the obtained tracking trajectories;

(7) Features are extracted from the candidate areas:

(7a) Features are extracted from a single piece of RD map:

By setting a threshold and filtering out noise with principal components and secondary components of the targets left, 10 features are extracted from the threshold-crossing RD map, including range dimension extension $\Delta L$, velocity dimension extension $\Delta V$, number of threshold-crossing points N, total energy SE, principal component energy ME, principal component proportion MP, secondary component mean value VEA, secondary component variance VEV, secondary component standard deviation VES and entropy E;

(7b) Features are extracted from two successive pieces of RD maps:

(7b1) By setting a threshold and filtering out noise with principal components and secondary components of the targets left, the features same as those of (7a) are extracted from the two threshold-crossing RD maps, respectively;

(7b2) By virtue of the features extracted in (7b1), the difference is calculated between the corresponding features of the two successive RD maps, and 12 features are obtained, including principal component range dimension variation MLC, principal component velocity dimension variation MVC, range dimension extension variation $\Delta LC$, velocity dimension extension variation $\Delta VC$, scattering point number variation NC, total energy variation SEC, principal component energy variation MEC, principal component proportion variation MPC, secondary component mean value variation VEAC, secondary component variance variation VEVC, secondary component standard deviation variation VESC and entropy variation EC;

(7b3) The two RD maps subjected to the threshold-crossing operation in (7b1) are aligned for subtracting to obtain an absolute value to form a difference matrix, from which 8 features are extracted, including the number of energy generation change points M, the total energy of the difference matrix SDE, the mean value of energy change at each point DEA, the difference matrix variance DV, the standard deviation of the difference matrix DS, the entropy of the difference matrix DE, the range dimension extension of the difference matrix $\Delta W$ and the velocity dimension extension of the difference matrix $\Delta D$.

In comparison to the prior art the present disclosure provides the following advantages:

Firstly, the present disclosure provides a new strategy of extracting target features by using two successive RD maps, introduces time sequence information into the feature extraction process, and makes full use of raw radar echo information, so as to obtain more features facilitating the road surface target classification. In the case of limited radar hardware conditions, the present disclosure solves the problem in the prior art that targets that are similar in physical shape and motion state cannot be distinguished solely by extracting features from a single piece of RD map.

Secondly, the present disclosure perfects the whole process from the acquisition of the raw radar echo of targets till the feature extraction by using the RD map. Compared with the prior art where only the last step of feature extraction is performed in the whole technical process without considering the problems of ground clutter removal, target detection and tracking and target slice extraction involved in the raw echo, the present disclosure integrates the whole process from the acquisition of the raw echo till the feature extraction, improves the extraction efficiency of the target slice, and provides the possibility for the real-time implementation of the whole feature extraction process.

DETAILED DESCRIPTION OF THE EMBODIMENTS

Specific embodiments and effects provided in the present disclosure will be further described with reference to accompanying drawings below.

Figure 1:
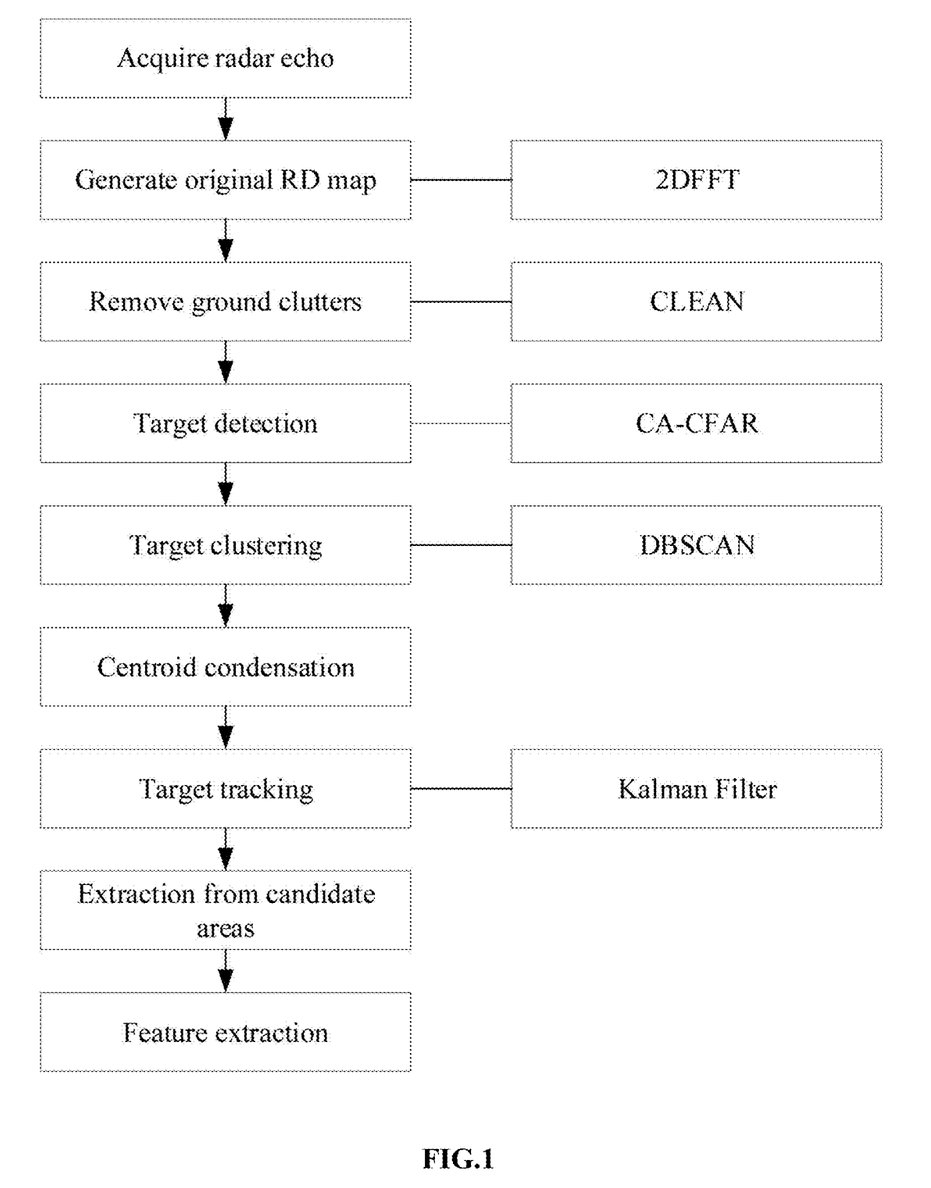
FIG. 1 is an implementation flow chart of the method according to the present disclosure.

Referring to FIG. 1, this example is implemented as follows:

In Step 1, measured data is acquired,

For different types of millimeter-wave radars, due to the difference between their parameters such as carrier frequency, bandwidth, frequency modulation slope and frame length, their parameters presented on the Range Doppler RD map such as range resolution, maximum unambiguous range, velocity resolution and maximum unambiguous velocity will be different as well. In order to achieve a better and more robust classification effect of the extracted features, it is necessary to ensure that the radar parameters are consistent across the experimental process. This requirement is realized specifically as follows:

1.1) Setting radar parameters, transmitting linear frequency modulation continuous wave (LFMCW) generated based on the parameters to a road surface target in a real measurement scene, and receiving an echo signal from the target;

1.2) Using the transmitted signal and the received signal to obtain a difference frequency signal of the target, and performing analog-to-digital conversion on the difference frequency signal to obtain and save a raw radar echo of the target.

In Step 2, an original RD map is generated.

Figure 2:
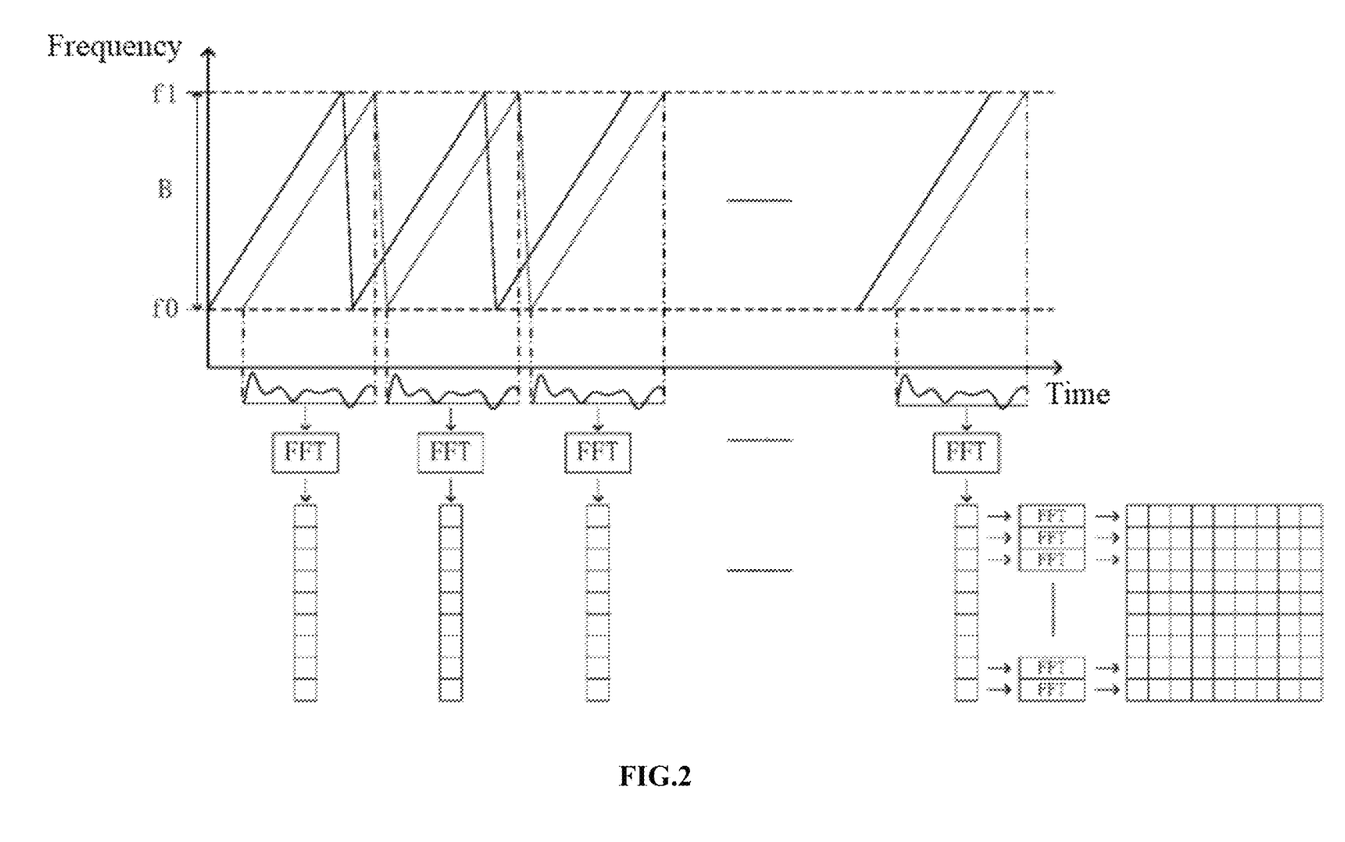
FIG. 2 is a schematic diagram of generating an original RD map by two-dimension Fourier transform (2DFFT) according to the present disclosure.

Referring to FIG. 2, this step is implemented as follows:

2.1) Performing the Fourier transform (FFT) along the fast time dimension of the raw radar echo, namely on each echo shown in FIG. 2;

2.2) Performing FFT along the slow time dimension, namely on a plurality of echoes that have been subjected to the fast time dimension FFT as shown in FIG. 2, so as to generate an original RD map of the target.

For the raw echo, since the target distance information can be solved and obtained by FFT along the fast time dimension and the target Doppler information can be solved and obtained by FFT along the slow time dimension, the two times of use of FFT is equivalent to two times of windowing, which can effectively improve the signal-to-noise ratio of the radar echo.

In Step 3, ground clutter is removed from the original Range Doppler RD map of the target.

After generating the original RD map, it can be found that there will be serious ground clutter along the range dimension at zero frequency of the Doppler dimension, which will greatly impact the subsequent operations, no matter the target detection or target tracking. Therefore, it is necessary to deal with the ground clutter in the original RD map. A relatively basic CLEAN algorithm is used here for explanation. It may be replaced by any better algorithm for removing ground clutter accordingly.

Figure 3A:
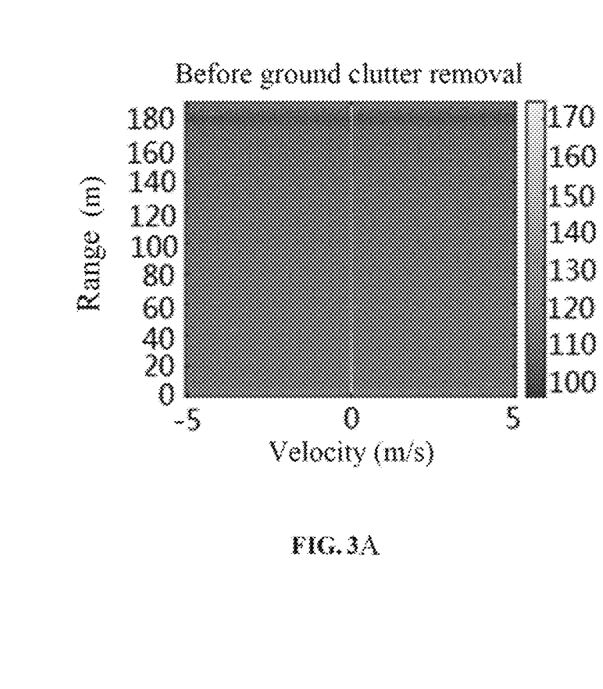
FIGS. 3A and 3B are comparison diagrams of the RD map before and after clutter removal according to the present disclosure.
Figure 3B:
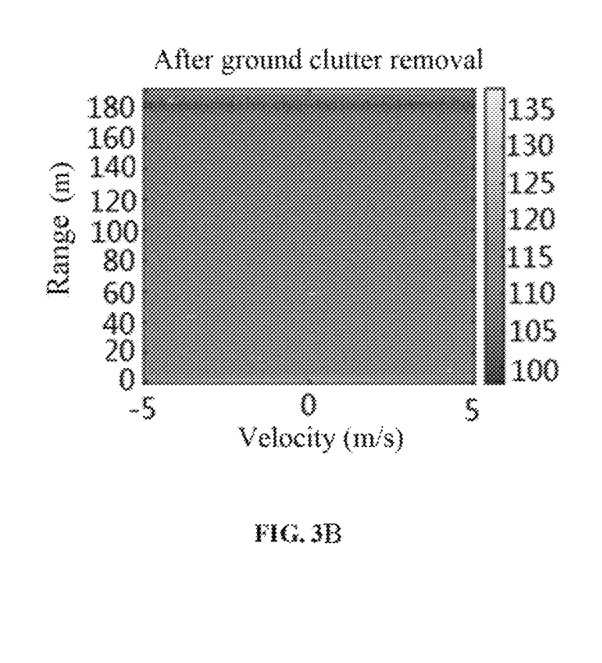

This example utilizes, but not limited to, a CLEAN algorithm to remove ground clutter in the original Range Doppler RD map of the target, which is specifically implemented as follows:

3.1) For each line of the RD map, finding out the ground clutter area and the number of Doppler cells contained in the ground clutter area adaptively, and smoothing these Doppler cells;

3.2) Performing IFFT operation on each line of the RD map to obtain a raw radar echo of the line, and obtaining the number of Doppler cells contained in the ground clutter area of the line through 3.1);

3.3) Estimating the clutter energy in the radar echo according to radar parameters, performing discrete Fourier transform on the raw radar echo obtained in 3.2) to obtain a Doppler spectrum of the echo signal, searching the Doppler spectrum for the maximum value of the ground clutter area mentioned in 3.1) and its corresponding phase, amplitude and Doppler frequency, and reconstructing a time-domain signal corresponding to the maximum value of the ground clutter area;

3.4) Using the raw echo signal obtained in 3.2) to subtract the time-domain signal corresponding to the maximum value of the reconstructed ground clutter area in 3.3), so as to obtain a processed echo signal, and calculating the energy of the echo signal in the ground clutter area;

3.5) Determining whether the energy of the processed echo signal in the clutter area is less than the estimated clutter energy in 3.3); if so, obtaining the radar echo signal after the clutter removal in each row; otherwise returning to 3.3);

3.6) Performing the FFT operation on the radar echo signal obtained in 3.5) which has ground clutter removed in each line, and obtaining the RD map with ground clutter removed as shown in FIGS. 3A and 3B. In FIGS. 3A and 3B, FIG. 3A is the RD map with ground clutter not removed yet, and FIG. 3B is the RD map with ground clutter removed by this scheme. Comparing Fig. FIG. 3A with FIG. 3B, it sees a good effect of removing ground clutter by this scheme.

In Step 4, it is to detect the target of the RD map with clutter removed.

After clutter suppression of the original RD map, there will be multiple targets existing across the RD map, thus scattering a number of scattering points. In addition, the appearance of noise will complicate the RD map, so it is necessary to detect the targets on the RD map after clutter removal.

Figure 4:
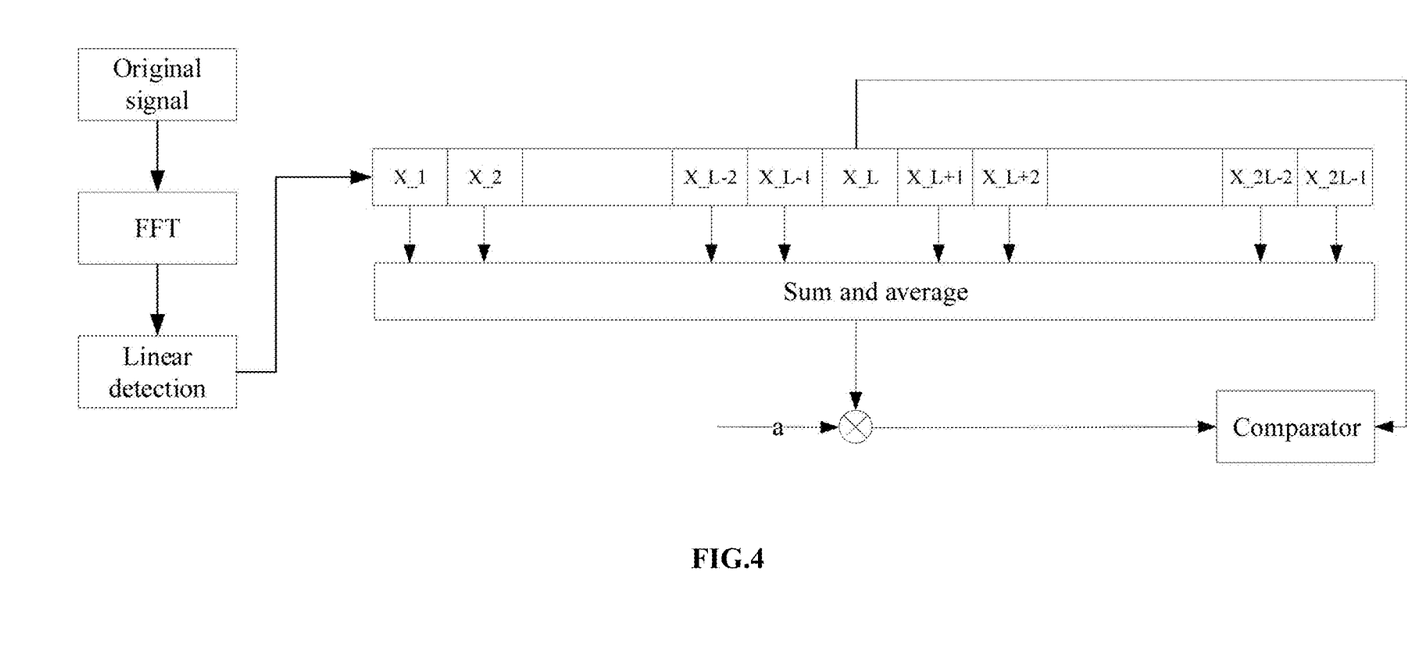
FIG. 4 is a schematic flow diagram of the conventional cell averaging-constant false alarm rate (CA-CFAR)

As shown in FIG. 4, it shows different variant methods of CFAR are used in the target detection on the RD map in the prior art, wherein the traditional CA-CFAR algorithm is most widely used. The algorithm operates along each line of the RD map. By calculating a mean value of several adjacent reference cells on the left side and several reference cells on the right side, a threshold is set. After comparing with the cell to be detected at the current position, it is determined whether the cell pertains to a target, and the target detection task is completed. Although this method can be used in target detection of the RD map, it is limited to processing only a single dimension, which will lead to false alarms and missed alarms.

Figure 5:
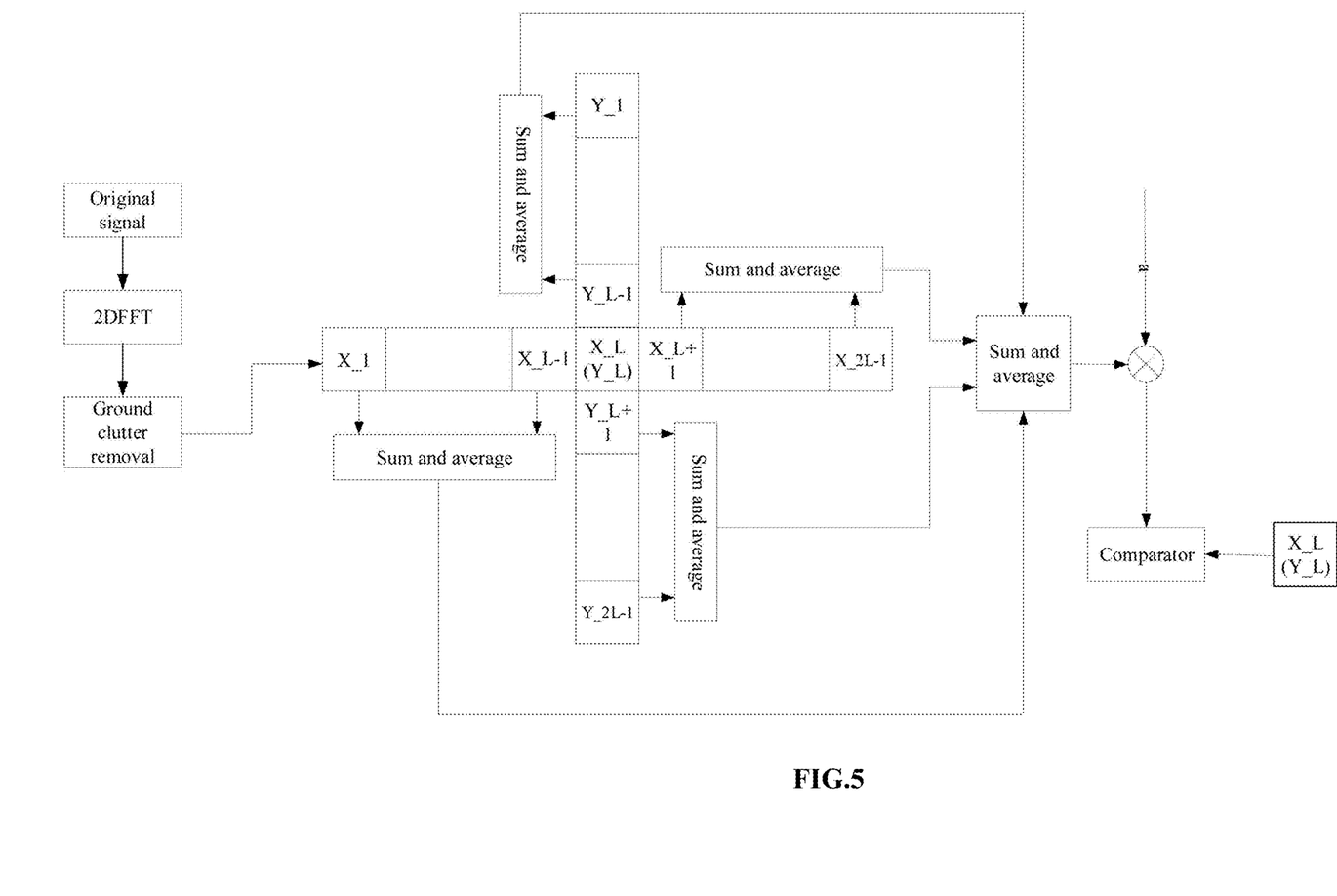
FIG. 5 is a schematic flow diagram of the improved cell averaging-constant false alarm rate (CA-CFAR)

According to the present disclosure, the traditional CA-CFAR algorithm is improved from a single dimension processing method to a two-dimensional matrix processing method, as shown in FIG. 5.

Referring to FIG. 5, this step is implemented as follows:

4.1) A cell to be detected is selected, and energy average values of several adjacent reference cells to the left of, to the right of, on top of, and below the cell to be detected are calculated;

4.2) According to specific experimental scenes and conditions, a threshold is set by using the energy average values obtained in 4.1), so as to compare the energy of the current cell to be detected with the threshold, wherein: if the energy of the cell to be detected is greater than or equal to the threshold, the cell is determined to be a target and its coordinate is recorded, otherwise the cell is dismissed;

4.3) Operations 4.1) and 4.2) are performed on all pixels in the RD map to obtain all detected target points in the RD map.

In Step 5, the detected targets are clustered.

After the target detection is done, a same target may be detected as multiple target points through the detection due to its over large volume, different scattering intensities and different motion states at various positions. Therefore, it is necessary to use a clustering algorithm on the basis of detection to cluster the detected targets.

The method of density-based spatial clustering of applications with noise (DBSCAN) is a typical density clustering algorithm, which is suitable for both convex and non-convex sample sets, and can effectively remove the influence of noise. This example utilizes, but not limited to, the DBSCAN algorithm to cluster the targets, which is specifically implemented as follows:

5.1) Randomly selecting a core object not classified yet as a seed, finding out all sample sets that the density of this core object can reach, forming a cluster by all such sample sets, and marking the category of the cluster;

5.2) Again, randomly selecting another core object not classified yet to find out sample sets that the density of this core object can reach, forming another cluster and marking the category of the cluster;

5.3) Repeating 5.2) until all core objects are classified.

Terminologies in this step are explained as follows:

Neighborhood, which refers to, for a certain sample, the collection of other samples within a distance of a certain value from it.

Core object, which represents samples whose number in the neighborhood is larger than a certain fixed value.

Directly density-reachable, which refers to that if an object is located in the neighborhood of the core object, the relationship between the core object and the object is referred to as directly density-reachable.

Density-reachable, which means that if objects 1, 2 and 3 are all core objects, and if object 1 is directly reachable to object 2 and object 2 is directly reachable to object 3, the relationship between object 1 and object 3 is referred to as density-reachable.

Density-connected, which means that if objects 4, 5 and 6 are all core objects, and if objects 4 and 5 are both density reachable to both object 6, the relationship between object 4 and object 6 is referred to as density-connected.

In Step 6, centroid condensation is performed on the clustered targets.

After the target detection and clustering are done, if there are several core objects in a same target, it is not easy to track these core objects directly. Therefore, before tracking, it is necessary to perform centroid condensation on the clusters that have clustered already, which is specifically implemented as follows:

In a same cluster, if there are multiple core objects, a mean value of horizontal and vertical coordinates of all core objects are calculated as the position coordinate of the target after condensation; if there is only one core object, its coordinate is just the coordinate value of the target after condensation.

In Step 7, the target tracking is performed on the continuous multi-frame RD maps.

After generating the continuous multi-frame RD maps and obtaining the coordinate through the target centroid condensation, the target is tracked. The tracking method based on Kalman filtering is relatively fundamental and easy to implement. This method is to estimate the true value based on the observed value and the estimated value in essence. This example uses, but is not limited to, the tracking method based on Kalman filtering.

Figure 6:
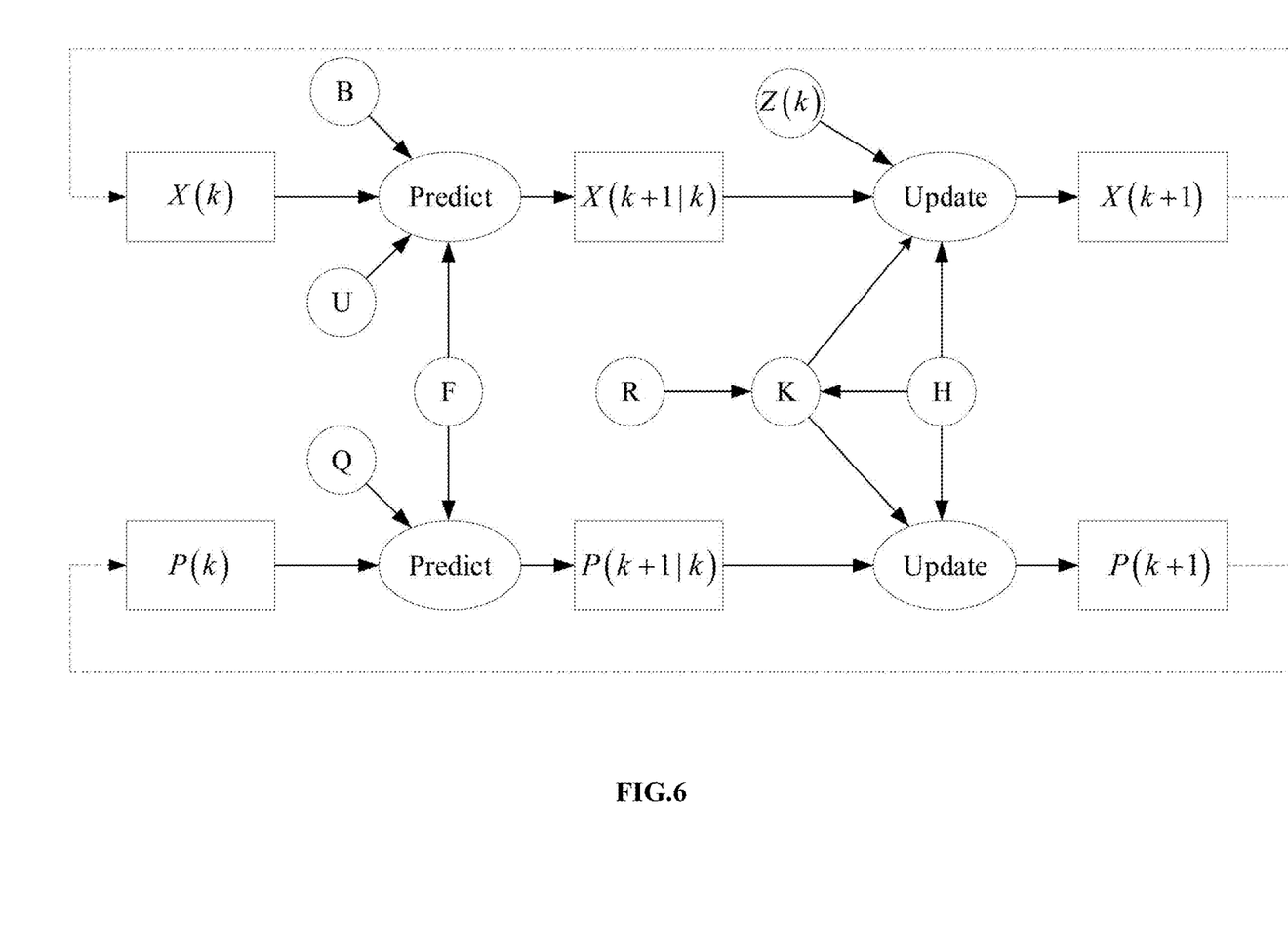
FIG. 6 is a schematic flow chart of the Kalman filtering algorithm used in the tracking process according to the present disclosure.

Referring to FIG. 6, this step is implemented as follows:
7.1) Obtaining the observed value of the target at the current time through target detection, clustering and centroid condensation Z(k);
7.2) Calculating the state variable X(k+1|k) and covariance matrix P(k+1|k) at the time k+1 predicted by using the tracking result at the time k according to the following formula:

$$X(k+1|k)=FX(k)+BU(k)+W(k),$$

$$P(k+1|k)=FP(k)F^T+Q,$$

Wherein F is the transformation matrix, $F^T$ is the transposition of transformation matrix, B is the control matrix, X(k) is the state variable obtained by tracking at time k, P(k) is the covariance matrix obtained by tracking at time k, U(k) is the control gain of current state, W(k) represents the noise at time k, and Q represents the covariance of system process noise.
7.3) According to the covariance matrix obtained in 7.2), calculating the Kalman gain K:

$$K=P(k+1|k)H^T(HP(k+1|k)H^T+R)^{-1},$$

Wherein H is the observation matrix, $H^T$ is the transposition of the observation matrix, R represents the covariance of the object measurement noise, and $(\bullet)^{-1}$ represents the inversion of the elements in parentheses;
7.4) According to the state variable and covariance matrix obtained in 7.2) and the Kalman gain obtained in 7.3), calculating the state variable X(k+1) and covariance matrix P(k+1) obtained by tracking at time k+1:

$$X(k+1)=X(k+1|k)+K(Z(k)-HX(k+1|k)),$$

$$P(k+1)=(1-KH)P(k+1|k).$$

Figure 7:
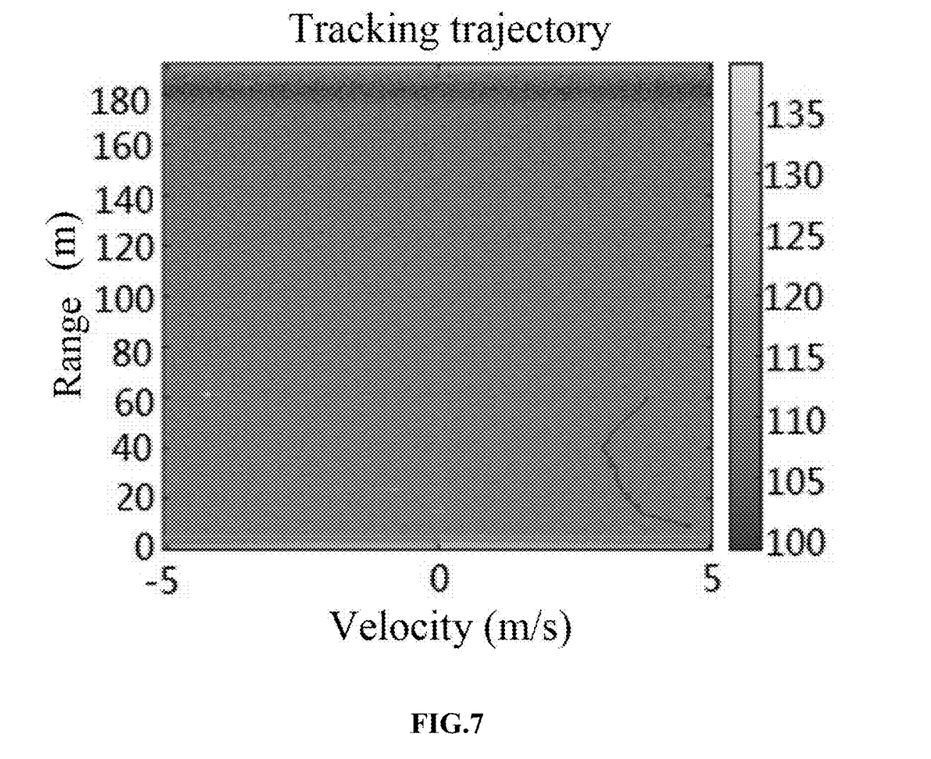
FIG. 7 is an effect diagram of a four-wheeled vehicle target tracking according to the present disclosure.
Figure 8:
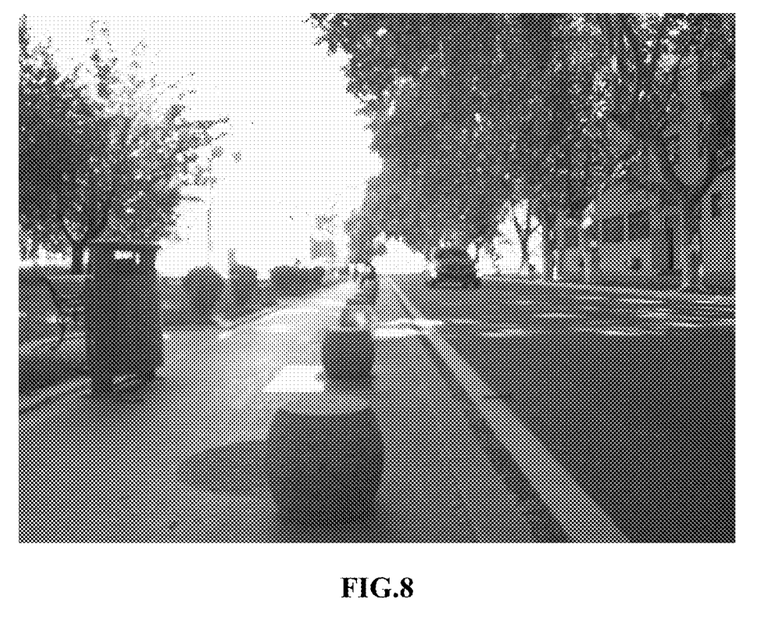
FIG. 8 is a video screen-shot corresponding to the effect diagram of the four-wheeled vehicle target tracking according to the present disclosure.
Figure 9:
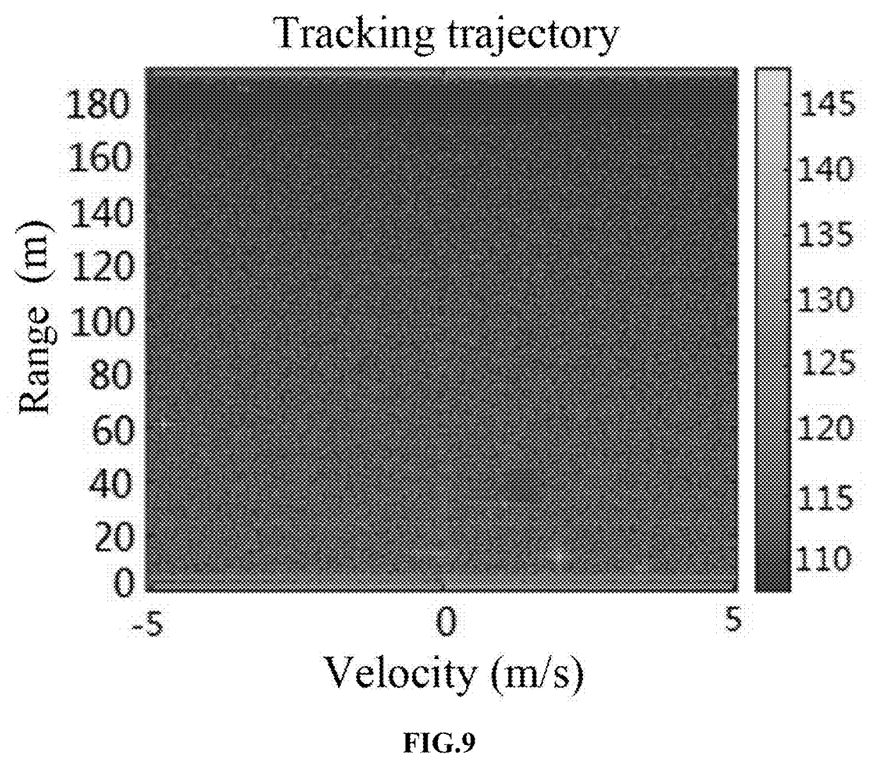
FIG. 9 is an effect diagram of a pedestrian target tracking according to the present disclosure.
Figure 10:
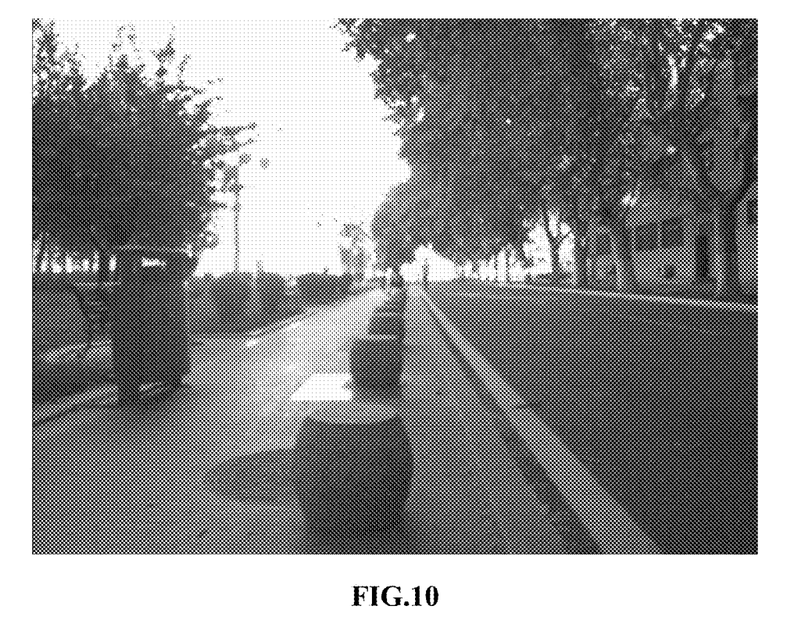
FIG. 10 is a video screen-shot corresponding to the effect diagram of the pedestrian target tracking according to the present disclosure.

According to the above process, Kalman filtering is performed on the continuous multi-frame RD maps that have completed ground clutter removal, target detection, clustering and centroid condensation, so as to complete the target tracking. Furthermore, by controlling the Kalman gain, a larger gain indicates that the observed value is more convincible, a smaller gain indicates that the predicted value is more convincing. By combining the results of the both parts, the target tracking result with a higher confidence level can be obtained, as shown in FIGS. 7-10, wherein: FIG. 7 is the effect diagram of a four-wheeled vehicle target tracking by this scheme; FIG. 8 is a video screen-shot corresponding to the effect diagram of the four-wheeled vehicle target tracking by this scheme; FIG. 9 is an effect diagram of a pedestrian target tracking by this scheme; and FIG. 10 is a video screen-shot corresponding to the effect diagram of the pedestrian target tracking by this scheme. It can be seen from the four diagrams of tracking results of four-wheeled vehicles and pedestrians that the present disclosure provides a good effect of road target tracking.

In the specific experiment processes, after the target tracking of the corresponding RD map is completed, it is necessary to record the movement trajectory of the target so as to prepare for the selection of subsequent candidate areas.

In Step 8, the candidate area is obtained.

After the target movement trajectory is obtained, the target tracking position coordinate is located in the corresponding RD map according to the tracking trajectory, and the target candidate area is extracted according to the coordinate, which is specifically implemented as follows:
8.1) Taking the tracked coordinate as the center, expanding the coordinate in four directions: up, down, left and right, and capturing the slice sized 20*40 and centered on the target tracking coordinate from the RD map;
8.2) Taking the tracked trajectory as the center, expanding the trajectory in four directions: up, down, left and right, and keep the original energy value of the RD map unchanged within the area sized 20*40 and centered on the target tracking coordinate, and setting the energy value at other positions of the RD map to zero.

In Step 9, features are extracted from the candidate areas.

After obtaining the target candidate area, the feature extraction is carried out. The motion components of human walking mainly include the translation generated by the trunk and the micro-motion component generated by swinging limbs, while the motion components of vehicles such as two-wheeled and four-wheeled vehicles mainly include the translation component generated by the vehicle body and the micro-motion component generated by rotating wheels. When different targets are moving, the range and velocity information generated by micro-motions vary, which is the theoretical basis for feature extraction of targets.

Feature extraction mainly includes the single-RD-map feature extraction and two-successive-RD-maps feature extraction. The two schemes will be introduced as follows, respectively.

For extracting features from a single RD map, slices are extracted from the RD map with the method described in 8.1); for extracting features from two successive RD maps, since the features are associated to the time sequences and the scattering point positions in the previous and next RD maps, slices are extracted from the RD maps by the method described in 8.2).

Before the feature extraction, in order to ensure a small influence of noise, sidelobe and other factors on the feature extraction as possible, it is necessary to threshold the RD slices by experience and according to specific experimental scenes, with the translation components and micro-motion components of the targets left only.

This step is specifically implemented as follows:
9.1) Features are extracted from a single piece of RD map:
Feature 1: Range Dimension Extension $$\Delta L=\Delta R(r\_top-r\_down+1),$$

Wherein $\Delta R$ is the range resolution of the RD map, r_top and r_down are the vertical coordinates corresponding to the uppermost and lowermost non-zero pixels respectively;
Feature 2: velocity dimension extension $$\Delta V=\Delta v(d\_right-d\_left+1)$$

Wherein $\Delta v$ is the velocity resolution of the RD map, d_right and d_left are the lateral coordinates corresponding to the rightmost and leftmost non-zero pixels respectively;
Feature 3: number of threshold-crossing points $$N = \sum_{i=1}^{H} q_i,$$

Wherein $$q_i = \begin{cases} 1 \text{ if } rdenergy_i \neq 0 \\ 0 \text{ if } rdenergy_i = 0 \end{cases},$$

H is the total number of pixels in the RD map, and rdenergy$_i$ is the energy value of the ith pixel in the RD map;

Feature 4: total energy $$SE = \sum_{i=1}^{N} energy_i,$$

Wherein energy$_i$ is the energy value of the ith non-zero pixel in the RD map;

Feature 5: principal component energy $$ME = \sum_{j=1}^{n} main\_energy_j,$$

Wherein main_energy$_j$ is the energy value of the jth non-zero pixel of the principal component, and n is the number of non-zero pixels of the principal component;

Feature 6: principal component proportion $$MP = ME/SE;$$

Feature 7: secondary component mean value $$VEA = (SE-ME)/(N-n).$$

Feature 8: secondary component variance $$VEV = \sum_{i=1}^{N-n} [energy_i - (SE - ME)/(N-n)]^2 / (N-n);$$

Feature 9: secondary component standard deviation $$VES = sqrt\left\{\sum_{i=1}^{N-n} [energy_i - (SE - ME)/(N-n)]^2 / (N-n)\right\},$$

Wherein sqrt(•) represents extraction of the square root of the elements in brackets;

Feature 10: entropy $$E = -\sum_{i=1}^{N} p_i \ln p_i,$$

Wherein $p_i$=energy$_i$/SE and ln(•) represents solving the natural logarithm for the elements in brackets;

The above-mentioned 10 features are extracted from a single RD map, which can reflect the micro-motion information and physical structure information of the target at that current time. The target with rich micro-motion information has a larger value of the secondary component mean value and secondary component variance, while the target with less micro-motion information has a higher principal component proportion.

9.2) Features are extracted from two successive RD maps:
9.2.1) Solving 10 features same as those in 9.1);
9.2.2) According to the results of 9.2.1), calculating the related features of the following variations:
Feature 1: principal component range dimension variation $$MLC = abs(d_1 - d_2);$$

Feature 2: principal component velocity dimension variation $$MVC = abs(r_1 - r_2),$$

Wherein $C_1(d_1,r_1)$, $C_2(d_2,r_2)$ are the coordinates of the principal component center points of two RD maps, and abs(•) represents solving the absolute value of the elements in brackets.

Feature 3: range dimension extension variation $$\Delta LC = abs\{\Delta R[(r\_top_1 - r\_down_1) - (r\_top_2 - r\_down_2)]\},$$

Wherein $\Delta R$ is the range resolution of the RD map, r_top$_1$, r_down$_1$, r_top$_2$, and r_down$_2$ are the vertical coordinates corresponding to the uppermost and lowermost non-zero pixels of the two RD maps respectively;

Feature 4: velocity dimension extension variation $$\Delta VC = abs\{\Delta v[(d\_right_1 - d\_left_1) - (d\_right_2 - d\_left_2)]\},$$

Wherein $\Delta v$ is the velocity resolution of the RD map d_right$_1$, d_left$_1$, d_right$_2$, and d_left$_2$ are the lateral coordinates corresponding to the rightmost and leftmost non-zero pixels of the two RD maps respectively;

Feature 5: scattering point number variation $$NC = abs(N_1 - N_2),$$

Wherein $N_1$, $N_2$ are the numbers of non-zero pixels of the two RD maps after the threshold processing, respectively;

Feature 6: total energy variation $$SEC = abs(SE_1 - SE_2)$$

Wherein $SEC_1$, $SE_2$ are the energy sums of all non-zero pixels of the two RD maps, respectively;

Feature 7: principal component energy variation $$MEC = abs(ME_1 - ME_2),$$

Wherein $ME_1$, $ME_2$ are the principal component energy sums of the two RD maps, respectively;

Feature 8: principal component proportion variation $$MPC = abs\left(\frac{ME_1}{SE_1} - \frac{ME_2}{SE_2}\right);$$

Feature 9: secondary component mean value variation $$VEAC = abs\left(\frac{SE_1 - ME_1}{N_1 - n_1} - \frac{SE_2 - ME_2}{N_2 - n_2}\right),$$

Wherein $n_1$, $n_2$ are the numbers of principal component non-zero pixels of the two RD maps, respectively;

Feature 10: secondary component variance variation $$VEVC = abs\left\{\begin{array}{l}\sum_{i=1}^{N_1-n_1}\left(energy_{1\_i} - \frac{SE_1 - ME_1}{N_1 - n_1}\right)^2 / (N_1 - n_1) \\ -\sum_{j=1}^{N_2-n_2}\left(energy_{2\_j} - \frac{SE_2 - ME_2}{N_2 - n_2}\right)^2 / (N_2 - n_2)\end{array}\right\},$$

Wherein energy$_{1\_i}$ represents the energy value of the ith non-zero pixel in the first RD map, and energy$_{2\_j}$ represents the energy value of the jth non-zero pixel in the first RD map;

Feature 11: secondary component standard deviation variation $$VESC = \text{abs}\left\{\begin{array}{l}\text{sqrt}\left[\sum_{i=1}^{N_1-n_1}\left(energy_{1\_i} - \frac{SE_1 - ME_1}{N_1 - n_1}\right)^2 / (N_1 - n_1)\right] \\ -\text{sqrt}\left[\sum_{j=1}^{N_2-n_2}\left(energy_{2\_j} - \frac{SE_2 - ME_2}{N_2 - n_2}\right)^2 / (N_2 - n_2)\right]\end{array}\right\},$$

Wherein sqrt(•) represents extraction of the square root of the elements in brackets;

Feature 12: entropy variation $$EC = -\left(\sum_{i=1}^{N_1} p_{1\_i}\ln p_{1\_i} + \sum_{j=1}^{N_2} p_{2\_j}\ln p_{2\_j}\right).$$

Wherein $P_{1\_i}$=energy$_{1\_i}$/SE$_1$, $p_{2\_i}$=energy$_{2\_i}$/SE$_2$, and ln(•) represent solving the natural logarithms for the elements in brackets;

The above 12 features are obtained by solving the differences between features of each single map of the two successive RD maps. Time series information can be introduced into new features to show the micro-motion information of the target. The target with rich micro-motion information has a large fluctuation in the number variation of scattering points and the mean value variation of secondary components, while the target with less micro-motion information will not change significantly.

9.2.3) After the two RD maps were aligned and subtracted to obtain the absolute value, the difference matrix was obtained, and then extracting the following features.

Feature A: number of energy generation change points $$M = \sum_{i=1}^{G} q_i,$$

Wherein $$q_i = \begin{cases} 1 & \text{if delta\_rdenergy}_i \neq 0 \\ 0 & \text{if delta\_rdenergy}_i = 0 \end{cases},$$

G are the total numbers of difference matrix pixels, and delta_rdenergy$_i$ is the energy value of the ith pixel in the difference matrix;

Feature B: total energy of difference matrix $$SDE = \sum_{i=1}^{M} \text{delta\_energy}_i,$$

Wherein delta_energy$_i$ is the energy value of the ith non-zero pixel in the difference matrix;

Feature C: mean value of energy change at each point $$DEA = SDE/M;$$

Feature D: difference matrix variance $$DV = \sum_{i=1}^{M}[\text{delta\_energy}_i - SDE/M]^2 / M;$$

Feature E: difference matrix standard deviation $$DS = \text{sqrt}\left\{\sum_{i=1}^{M}[\text{delta\_energy}_i - SDE/M]^2 / M\right\},$$

Wherein sqrt(•) represents extraction of the square root of the elements in brackets;

Feature F: entropy of the difference matrix $$DE = -\sum_{i=1}^{M} p_i \ln p_i,$$

Wherein $p_i$=delta_energy$_i$/SDE and ln(•) represents solving the natural logarithm for the elements in brackets;

Feature G: range dimension extension of difference matrix $$\Delta W = y\_top - y\_down + 1,$$

Wherein y_top and y_down are the vertical coordinates corresponding to the uppermost and lowermost non-zero pixels of the difference matrix respectively;

Feature H: velocity dimension extension of difference matrix $$\Delta D = x\_right - x\_left + 1,$$

Wherein x_right and x_left are the vertical coordinates corresponding to the rightmost and leftmost non-zero pixels of the difference matrix respectively;

The above 8 features are calculated on the basis of the difference matrix that is obtained by aligning and then subtracting the two successive RD maps to solve the absolute value, which can reflect the energy change of the target due to the change of subject motions and micro-motion components.

The effect of the present disclosure can be further illustrated via the following simulation experiments.

I) Simulation Experimental Conditions

1. Evaluation Indicators

In order to evaluate the feature extraction method of the present disclosure and the traditional feature extraction method, different methods are used to extract features from simulation data and measured data so as to perform the classification experiment, and the classification accuracy of each type of road surface targets is calculated according to the following formula, respectively:

$$\gamma(c) = \frac{\varsigma(c)}{\xi(c)}$$

Wherein, γ(c) represents the classification accuracy of the c category of targets, ζ(c) represents the number of samples correctly classified for the c category of targets, and ξ(c) represents the total number of samples of the c category of targets.

The average classification accuracy is the mean value of tested recognition rates of all types of ground targets.

2. Experimental Platform

The software platform is Windows 10 operating system and Matlab R2020a;

The hardware platform is TI Awr1843.

3. Experimental Parameters

Parameters of millimeter-wave radar used in this experiment are as shown in Table 1 below:

TABLE 1

| Experimental parameters of micrometer-wave radar | |
|---|---|
| Carrier frequency (GHz) $f_0$ | 76 |
| Frequency modulation band width (MHz) | 400 |
| Frequency modulation duration T (us) | 40.96 |
| Frequency modulation slope (MHz/us) | 9.766 |
| Chirp repetition period (us) | 78.125 |
| Idle time $T_d$ (us) | 37.165 |
| Sampling frequency (MHz) | 12.5 |
| Number of sampling points per chirp | 512 |
| Number of Chirps | 256 |

II Simulation Experiment Content

In order to comprehensively evaluate the effect of the feature extraction method proposed by the present disclosure, classification experiments are carried out on the basis of simulation data and measured data respectively, with the specific experimental content being as follows:

Experimental Content Based on Simulation Data

The radar echo is directly simulated by the simulation data on the basis of the target motion model built by MATLAB, without considering the influence of ground clutter and noises on the echo. During the experiments, the traditional feature extraction method and the feature extraction method proposed in the present disclosure are used to extract the features from the extracted target slices, and a random forest classifier is used to carry out classification experiments.

1.1) Experiments of Two Classes: Pedestrians and Four-Wheeled Vehicles

In the experiments of two classes: pedestrians and two-wheeled vehicles, based on simulation data, both the features extracted by the traditional method and those extracted by the method of the present disclosure can achieve 100% accuracy, which is related to over-ideal simulation data conditions. However, it can still indicate that the features extracted on the basis of two successive RD maps are capable to a certain degree in classification.

1.2) Experiments of Three Classes: Pedestrians, Two-Wheeled Vehicles and Four-Wheeled Vehicles The experimental results of three classes: pedestrians, two-wheeled vehicles and four-wheeled vehicles based on simulation data are as shown in Table 2:

TABLE 2

| Experimental results of three classes based on simulation data | | | | |
|---|---|---|---|---|
| | Pedestrian | Two-wheeled vehicle | Four-wheeled vehicles | Average classification accuracy |
| Features extracted by traditional method | 0.93 | 0.96 | 1 | 0.9633 |
| Features extracted by the present disclosure | 0.98 | 0.98 | 1 | 0.9867 |

It can be seen from the experimental results shown in Table 2 that the average classification accuracy achievable by using the features extracted by the present disclosure is 0.9867, which is higher than the average accuracy of 0.9633 obtained by using features extracted by the traditional method, indicating that the features extracted by the present disclosure show better separability. In addition, it can be found by comparison that the classification accuracy of pedestrians and two-wheeled vehicles obtained by using the features extracted by the present disclosure is improved than that obtained by extracting features by using the traditional method, indicating that the features extracted by the present disclosure can achieve better classification results for the classification of moving objects with similar moving states and physical appearances thanks to the introduction of time sequence information and attentions on more change processes.

2. Experimental Content Based on Measured Data

The method provided in the present disclosure and the traditional method are respectively used for processing the radar echo data of the road surface target measured by the TI radar in the real measurement scene, in order to obtain target slices and extract features, and then the random forest classifier is used for classification experiments.

2.1) Experiments of Two Classes: Pedestrians and Four-Wheeled Vehicles

The experimental results of two classes: pedestrians and four-wheeled vehicles based on measured data are as shown in Table 3:

TABLE 3

| Experimental results of two classes based on measured data | | | |
|---|---|---|---|
| | Pedestrian | Four-wheeled vehicles | Average classification accuracy |
| Features extracted by traditional method | 0.87 | 0.83 | 0.85 |
| Features extracted by the present disclosure | 0.91 | 0.92 | 0.915 |

It can be seen from Table 3 that the average classification accuracy obtained by using the features extracted by the present disclosure is 0.915, which is greatly improved in comparison with the average classification accuracy of 0.85 obtained by using the features extracted by the traditional method, indicating that the features extracted by the present disclosure have better separability.

2.2) Experiments of Three Classes: Pedestrians, Two-Wheeled Vehicles and Four-Wheeled Vehicles The experimental results of pedestrians, two-wheeled vehicles and four-wheeled vehicles based on measured data are as shown in Table 4:

TABLE 4

| Experimental results of three classes based on measured data | | | | |
|---|---|---|---|---|
| | Pedestrian | Two-wheeled vehicle | Four-wheeled vehicles | Average classification accuracy |
| Features extracted by traditional method | 0.83 | 0.56 | 0.85 | 0.7466 |
| Features extracted by the present disclosure | 0.9 | 0.66 | 0.87 | 0.8100 |

It can be seen from Table 4 that the average classification accuracy obtained by using the features extracted by the present disclosure may reach 0.8100, which is higher than the average classification accuracy of 0.7466 obtained by the features extracted by the traditional method, indicating that the features extracted by the present disclosure may achieve better classification effect than those extracted by the traditional method, and have better separability.

In addition, by comparison between the experimental processes of the present disclosure and the traditional method, it can be found that the present disclosure can save a lot of time in the process of object slice extraction, so as to enable the possibility for the real-time realization of the feature extraction.

What is claimed is:

1. A method of target feature extraction based on millimeter-wave radar echo, comprising:
   (1) Measured target data based on millimeter-wave radar is obtained, and an original Range Doppler RD map of targets is generated by using the measured data;
   (2) Ground clutter in the original Range Doppler RD map of the targets is removed;
   (3) An improved cell-averaging CFAR algorithm is used to detect the targets on the RD map with clutter removed:
   (3a) A cell to be detected is selected, and energy average values of several adjacent reference cells to the left of, to the right of, on top of, and below the cell to be detected are calculated;
   (3b) According to specific experimental scenes and conditions, a threshold is set by using the energy average values obtained in (3a), so as to compare the energy of the current cell to be detected with the threshold, wherein: if the energy of the cell to be detected is greater than or equal to the threshold, the cell is determined to be a target and its coordinate is recorded, otherwise the cell is dismissed;
   (3c) Operations (3a) and (3b) are performed on all pixels in the RD map to obtain all detected target points in the RD map;
   (4) Detected targets are clustered by using a density-based spatial clustering of applications with noise (DBSCAN) algorithm, and then centroid condensation is performed on the clustered targets;
   (5) (1) to (4) are repeated to obtain a continuous multi-frame RD maps;
   (6) A Kalman filtering method is used for tracking targets on the continuous multi-frame RD maps obtained in (5), and candidate areas on each RD map are selected according to the obtained tracking trajectories;
   (7) Features are extracted from the candidate areas:
   (7a) Features are extracted from each of the continuous multi-frame RD maps:
   By setting a threshold and filtering out noise with principal components and secondary components of the targets left, 10 features are extracted from the threshold-crossing RD map, including range dimension extension ΔL, velocity dimension extension ΔV, number of threshold-crossing points N, total energy SE, principal component energy ME, principal component proportion MP, secondary component mean value VEA, secondary component variance VEV, secondary component standard deviation VES and entropy E;
   (7b) Features are extracted from two successive RD maps of the continuous multi-frame RD maps:
   (7b1) By setting a threshold and filtering out noise with principal components and secondary components of the targets left, the features same as those of (7a) are extracted from two successive RD maps, subjected to the filtering, of the continuous multi-frame RD maps, respectively;
   (7b2) By virtue of the features extracted in (7b1), the difference is calculated between the corresponding features of the two successive RD maps, and 12 features are obtained, including principal component range dimension variation MLC, principal component velocity dimension variation MVC, range dimension extension variation ΔLC, velocity dimension extension variation ΔVC, scattering point number variation NC, total energy variation SEC, principal component energy variation MEC, principal component proportion variation MPC, secondary component mean value variation VEAC, secondary component variance variation VEVC, secondary component standard deviation variation VESC and entropy variation EC;
   (7b3) The two successive RD maps subjected to the threshold-crossing operation in (7b1) are aligned for subtracting to obtain an absolute value to form a difference matrix, from which 8 features are extracted, including the number of energy generation change points M, the total energy of the difference matrix SDE, the mean value of energy change at each point DEA, the difference matrix variance DV, the standard deviation of the difference matrix DS, the entropy of the difference matrix DE, the range dimension extension of the difference matrix ΔW and the velocity dimension extension of the difference matrix ΔD and;
   (8) The extracted features of the continuous multi-frame RD maps are inputted into a random forest classifier for classification, to output classification results of the targets.

2. The method according to claim 1, wherein a CLEAN algorithm is used in (2) to remove ground clutter in the original Range Doppler RD map of the targets as follows:
   (2a) For each line of the RD map, finding out a ground clutter area and a number of Doppler cells contained in the ground clutter area adaptively, and smoothing these Doppler cells;
   (2b) Performing IFFT operation on each line of the RD map to obtain a raw radar echo of the line, and obtaining the number of Doppler cells contained in the ground clutter area of the line through (2a);
   (2c) Estimating clutter energy in the radar echo according to radar parameters, performing discrete Fourier transform on the raw radar echo obtained in (2b) to obtain a Doppler spectrum of an echo signal, searching the Doppler spectrum for the maximum value of the ground clutter area mentioned in (2a) and its corresponding phase, amplitude and Doppler frequency, and reconstructing a time-domain signal corresponding to the maximum value of the ground clutter area;
   (2d) Using a raw echo signal obtained in (2b) to subtract the time-domain signal corresponding to the maximum value of the reconstructed ground clutter area in (2c), so as to obtain a processed echo signal, and calculating the energy of the processed echo signal in the ground clutter area;
   (2e) Determining whether the energy of the processed echo signal in the clutter area is less than the estimated clutter energy in (2c); if so, obtaining the radar echo signal after the clutter removal in each row; otherwise returning to (2c);

(2f) Performing the FFT operation on the radar echo signal obtained in (2e) which has ground clutter removed in each line, and obtaining the RD map with ground clutter removed.

3. The method according to claim 1, wherein, in (4), the detected targets are clustered by using DBSCAN algorithm, and then centroid condensation is performed on the clustered targets, which is implemented as follows;
   (4a) Randomly selecting a first core object not classified yet as a seed, finding out all sample sets that the density of the first core object can reach, forming a cluster by all such sample sets, and marking the category of the cluster;
   (4b) Again, randomly selecting a second core object not classified yet to find out sample sets that the density of the second core object can reach, forming another cluster and marking the category of the cluster;
   (4c) Repeating (4b) until all core objects are classified;
   (4d) In a same cluster, if there are multiple core objects, a mean value of horizontal and vertical coordinates of all core objects are calculated as the position coordinate of the target after condensation; if there is only one core object, its coordinate is just the coordinate value of the target after condensation.

4. The method according to claim 1, wherein the target tracking is performed on the continuous multi-frame RD maps obtained by the Kalman filtering method in (6), which is implemented as follows:
   (6a) Obtaining an observed value Z(k) of the target at current time through target detection, clustering and centroid condensation;
   (6b) Calculating a state variable X(k+1|k) and covariance matrix P(k+1|k) at the time k+1 predicted by using a tracking result at the time k according to the following formula:

$X(k+1|k)=FX(k)+BU(k)+W(k)$, $P(k+1|k)=FP(k)F^T+Q$,

Wherein F is the transformation matrix, $F^T$ is the transposition of transformation matrix, B is the control matrix, X(k) is the state variable obtained by tracking at time k, P(k) is the covariance matrix obtained by tracking at time k, U(k) is the control gain of current state, W(k) represents the noise at time k, and Q represents a covariance of system process noise;
   (6c) According to the covariance matrix obtained in (6b), calculating the Kalman gain K:

$K=P(k+1|k)H^T(HP(k+1|k)H^T+R)^{-1}$,

Wherein H is the observation matrix, $H^T$ is the transposition of the observation matrix, R represents the covariance of the object measurement noise, and $(\cdot)^{-1}$ represents the inversion of the elements in parentheses;
   (6d) According to the state variable and covariance matrix obtained in (6b) and the Kalman gain obtained in (6c), calculating the state variable X(k+1) and covariance matrix P(k+1) obtained by tracking at time k+1:

$X(k+1)=X(k+1|k)+K(Z(k)-HX(k+1|k))$, $P(k+1)=(1-KH)P(k+1|k)$.

5. The method according to claim 1, wherein, in (7a), 10 features are obtained, comprising range dimension extension ΔL, velocity dimension extension ΔV, number of threshold-crossing points N, total energy SE, principal component energy ME, principal component proportion MP, secondary component mean value VEA, secondary component variance VEV, secondary component standard deviation VES and entropy E, expressed by the following formula;

$$\Delta L = \Delta R(r\_top - r\_down + 1)$$

$$\Delta V = \Delta v(d\_right - d\_left + 1)$$

$$N = \sum_{i=1}^{H} q_i$$

$$SE = \sum_{i=1}^{N} energy_i$$

$$ME = \sum_{j=1}^{n} main\_energy_j$$

$$MP = ME/SE$$

$$VEA = (SE - ME)/(N - n)$$

$$VEV = \sum_{i=1}^{N-n} [energy_i - (SE - ME)/(N - n)]^2 / (N - n)$$

$$VES = sqrt\left\{\sum_{i=1}^{N-n} [energy_i - (SE - ME)/(N - n)]^2 / (N - n)\right\}$$

$$E = -\sum_{i=1}^{N} p_i \ln p_i$$

Wherein ΔR is the range resolution of the RD map, r_top and r_down are the vertical coordinates corresponding to the uppermost and lowermost non-zero pixels respectively; Δv is the velocity resolution of the RD map, H is the total number of pixel points of the RD map, d_right and d_left the lateral coordinates corresponding to the rightmost and leftmost non-zero pixels respectively;

$$q_i = \begin{cases} 1 & \text{if } rdenergy_i \neq 0 \\ 0 & \text{if } rdenergy_i = 0 \end{cases},$$

wherein $rdenergy_i$ is the energy value of the ith pixel in the RD map, and $energy_i$ is the energy value of the ith non-zero pixel in the RD map; $main\_energy_j$ is the energy value of the jth non-zero pixel of the main component; n is the number of non-zero pixels of the main component; $p_i = energy_i/SE$ wherein sqrt(•) represents extracting the square root of the element in the bracket, and ln(•) represents solving the natural logarithm for the elements in the bracket.

6. The method according to claim 1, wherein, in (7b2), 12 features are obtained, comprising the principal component range dimension variation MLC, principal component velocity dimension variation MVC, range dimension extension variation ΔLC, velocity dimension extension variation ΔVC, scattering point number variation NC, total energy variation SEC, principal component energy variation MEC, principal component proportion variation MPC, secondary component mean value variation VEAC, secondary component variance variation VEVC, secondary component standard deviation variation VESC and entropy variation EC, expressed by the following formula;

$$MLC = \text{abs}(d_1 - d_2)$$

$$MVC = \text{abs}(r_1 - r_2)$$

$$\Delta LC = \text{abs}\{\Delta R[(\text{r\_top}_1 - \text{r\_down}_1) - (\text{r\_top}_2 - \text{r\_down}_2)]\}$$

$$\Delta VC = \text{abs}\{\Delta v[(\text{d\_right}_1 - \text{d\_left}_1) - (\text{d\_right}_2 - \text{d\_left}_2)]\}$$

$$NC = \text{abs}(N_1 - N_2)$$

$$SEC = \text{abs}(SE_1 - SE_2)$$

$$MEC = \text{abs}(ME_1 - ME_2)$$

$$MPC = \text{abs}\left(\frac{ME_1}{SE_1} - \frac{ME_2}{SE_2}\right)$$

$$VEAC = \text{abs}\left(\frac{SE_1 - ME_1}{N_1 - n_1} - \frac{SE_2 - ME_2}{N_2 - n_2}\right)$$

$$VEVC = \text{abs}\left\{\begin{array}{l}\sum_{i=1}^{N_1-n_1}\left(\text{energy}_{1\_i} - \frac{SE_1 - ME_1}{N_1 - n_1}\right)^2 \Big/ (N_1 - n_1) \\ -\sum_{j=1}^{N_2-n_2}\left(\text{energy}_{2\_j} - \frac{SE_2 - ME_2}{N_2 - n_2}\right)^2 \Big/ (N_2 - n_2)\end{array}\right\}$$

$$VESC = \left\{\begin{array}{l}sqrt\left[\sum_{i=1}^{N_1-n_1}\left(\text{energy}_{1\_i} - \frac{SE_1 - ME_1}{N_1 - n_1}\right)^2 \Big/ (N_1 - n_1)\right] \\ -sqrt\left[\sum_{j=1}^{N_2-n_2}\left(\text{energy}_{2\_j} - \frac{SE_2 - ME_2}{N_2 - n_2}\right)^2 \Big/ (N_2 - n_2)\right]\end{array}\right\}$$

$$EC = -\left(\sum_{i=1}^{N_1} p_{1\_i} \ln p_{1\_i} + \sum_{j=1}^{N_2} p_{2\_j} \ln p_{2\_j}\right)$$

Wherein $C_1(d_1, r_1)$ and $C_2(d_2, r_2)$ are coordinates of central points of the principal components in the two RD maps, $\Delta R$ is the range resolution of the RD map, $\Delta v$ is the velocity resolution of the RD map, $\text{r\_top}_1$, $\text{r\_down}_1$, $\text{r\_top}_2$, and $\text{r\_down}_2$ are the vertical coordinates corresponding to the uppermost and lowermost non-zero pixels in the two RD maps respectively, $\text{d\_right}_1$, $\text{d\_left}_1$, $\text{d\_right}_2$, and $\text{d\_left}_2$ are the lateral coordinates corresponding to the rightmost and leftmost non-zero pixels in the two RD maps respectively, $N_1$ and $N_2$ are the numbers of non-zero pixels of the two RD maps after the threshold processing respectively, $SE_1$ and $SE_2$ are energy sums of all non-zero pixels of the two RD maps respectively, $ME_1$ and $ME_2$ are energy sums of principal components of the two RD maps respectively, $n_1$ and $n_2$ are the numbers of non-zero pixels of principal components of two RD maps respectively, $\text{energy}_{1\_i}$ represents the energy value of the ith non-zero pixel of the first RD map, $\text{energy}_{2\_j}$ represents the energy value of the jth non-zero pixel of the first RD map, $p_{1\_i} = \text{energy}_{1\_i}/SE_i$, $p_{2\_j} = \text{energy}_{2\_j}/SE_2$, and sqrt(•) represent extracting the square root of the elements in brackets, abs(•) represents solving the absolute value of the elements in brackets, and ln(•) represents solving the natural logarithm for the elements in brackets.

7. The method according to claim 1, wherein, in (7b3), 8 features are extracted from the difference matrix, including the number of energy generation change points M, the total energy of the difference matrix SDE, the mean value of energy change at each point DEA, the difference matrix variance DV, the standard deviation of the difference matrix DS, the entropy of the difference matrix DE, the range dimension extension of the difference matrix $\Delta W$ and the velocity dimension extension of the difference matrix $\Delta D$, expressed by the following formula:

$$M = \sum_{i=1}^{G} q_i$$

$$SDE = \sum_{i=1}^{M} \text{delta\_energy}_i$$

$$DEA = SDE/M$$

$$DV = \sum_{i=1}^{M} [\text{delta\_energy}_i - SDE/M]^2 / M$$

$$DS = sqrt\left\{\sum_{i=1}^{M} [\text{delta\_energy}_i - SDE/M]^2 / M\right\}$$

$$DE = -\sum_{i=1}^{M} p_i \ln p_i$$

$$\Delta W = \text{y\_top} - \text{y\_down} + 1$$

$$\Delta D = \text{x\_right} - \text{x\_left} + 1$$

Where, $$q_i = \begin{cases} 1 & \text{if delta\_rdenergy}_i \neq 0 \\ 0 & \text{if delta\_rdenergy}_i = 0 \end{cases},$$

delta_rdenergy$_i$ is the energy value of the ith pixel of the difference matrix, delta_energy$_i$ is the energy value of the ith non-zero pixel of the difference matrix, G is the total number of pixel points in the difference matrix; $p_i = \text{delta\_energy}_i/SDE$, y_top, and y_down are vertical coordinates corresponding to the uppermost and lowermost non-zero pixels of the difference matrix respectively, x_right and x_left are the vertical coordinates corresponding to the rightmost and leftmost non-zero pixels of the difference matrix, respectively, and sqrt(•) represents extracting the square root of the elements in brackets, and ln(•) represents solving the natural logarithm for the elements in brackets.

\* \* \* \* \*